United States Patent
Knoener et al.

(10) Patent No.: US 12,290,888 B2
(45) Date of Patent: May 6, 2025

(54) METHOD AND SYSTEM FOR SHORT-ARC WELDING

(71) Applicant: Illinois Tool Works Inc., Glenview, IL (US)

(72) Inventors: Craig S. Knoener, Appleton, WI (US); Jake B. Zwayer, Appleton, WI (US); Zackary W. MacMullen, Larsen, WI (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 18/092,676

(22) Filed: Jan. 3, 2023

(65) Prior Publication Data

US 2023/0364700 A1 Nov. 16, 2023

Related U.S. Application Data

(63) Continuation of application No. 15/179,286, filed on Jun. 10, 2016, now Pat. No. 11,541,475.

(60) Provisional application No. 62/175,927, filed on Jun. 15, 2015.

(51) Int. Cl.
*B23K 9/173* (2006.01)
*B23K 9/09* (2006.01)

(52) U.S. Cl.
CPC .............. *B23K 9/173* (2013.01); *B23K 9/09* (2013.01)

(58) Field of Classification Search
CPC ........................................ B23K 9/09
USPC ............................ 219/130.1, 130.21, 130.31
See application file for complete search history.

(56) References Cited

U.S. PATENT DOCUMENTS

| | | | |
|---|---|---|---|
| 4,485,293 A | 11/1984 | Tabata | |
| 6,087,626 A | 7/2000 | Hutchison | |
| 6,627,850 B1 | 9/2003 | Koga | |
| 6,984,806 B2 | 1/2006 | Huismann | |
| 9,174,294 B2 * | 11/2015 | Hutchison | ............. B23K 9/0953 |
| 2004/0222204 A1 * | 11/2004 | Hutchison | ............. B23K 9/091 |
| | | | 219/130.21 |
| 2008/0264923 A1 | 10/2008 | White | |
| 2011/0226749 A1 | 9/2011 | Sato | |
| 2012/0080416 A1 | 4/2012 | Murakami | |
| 2014/0376268 A1 | 12/2014 | Manthe | |
| 2016/0361773 A1 * | 12/2016 | Knoener | .................. B23K 9/09 |

OTHER PUBLICATIONS

Int'l Search Report and Written Opinion AppIn No. PCT/US2021/037229 mailed Sep. 28, 2016.

* cited by examiner

*Primary Examiner* — Steven W Crabb
*Assistant Examiner* — Thomas J Ward
(74) *Attorney, Agent, or Firm* — McAndrews, Held & Malloy, Ltd.

(57) ABSTRACT

A method and apparatus for providing short arc welding-type power is disclosed. The system includes a power supply, a wire feeder, and a controller. The output current is decreased at dive rate when the arc forms. The dive rate is maintained until the currents drops to a threshold, preferably a function of the peak short current in that cycle. Then the current is held steady for a length of time that is a percentage of the short time for that cycle. Then the current is decreased at the normal rate until the short reforms, and the current begins increasing at the normal rate. The holding steady portion can be omitted.

16 Claims, 5 Drawing Sheets

METHOD AND SYSTEM FOR SHORT-ARC WELDING

FIELD OF THE INVENTION

The present disclosure relates generally to the art of providing welding-type power. More specifically, it relates to welding-type power supplies used for short arc welding.

BACKGROUND OF THE INVENTION

Many applications exist for welding and cutting systems used to join two or more workpieces to one another, or to cut workpieces. These applications exist throughout industry, but also for construction, ship building, maintenance, and so forth. In arc welding systems, electrical power is converted to a form useful for a welding process, and the power provides voltage and current necessary to establish and maintain arcs between an electrode and a workpiece. Plasma cutting and similar operations also require conditioned power adapted for the specific process. In gas metal arc welding (GMAW), the arc is established between an electrode that is advanced towards the workpiece and the workpiece itself. The electrode is often provided by a wire feeder, that is part of the welding-type system. The electrode is consumed insomuch as it is added to the weld as the weld puddle advances during the operation.

Some prior art GMAW systems with wire feeders allow the user to set the wire feed speed and the output voltage. Wire feed speed is often referred to by the user as "heat" and voltage as "spread". Higher wire feed speeds require more current for the higher burn-off rate to maintain the same arc voltage. Prior art welding-type systems can be voltage-controlled (CV) or current-controlled (CC).

In welding and cutting power supplies, power electronic circuitry is commonly switched on and off to control the desired power output used for the process. The switching is commonly performed by pulse width modulation (PWM) signals applied to the gates of power electronic switches of converter circuits within the supplies. Conventional systems utilize a single inverter in this converter circuitry, along with an inductor to smooth the output waveform. However, inductors in such systems can be quite large, adding additional cost and weight. Improvements in these systems have included the use of two or more inverters or converters which are switched to provide the desired output. The ripple amplitude of the output current is thereby reduced, consequently reducing the size of the output inductor, or in some cases eliminating the output inductor. One improved prior art system is described in US Patent publication 2014-0376268 (hereby incorporated by reference).

One welding process is a short arc (or short circuit) welding process. In short arc welding the output alternates between a short state and an arc state. A cycle of short arc welding is one short state and one arc state. The prior art Millermatic 211 Auto-Set w/MVP® welding system can be used for short arc welding when in a CV mode. The wire advances and shorts to the work. Because the output is a CV output and the current increases when the short occurs, the rate of increase is set by the system inductance (or the apparent inductance set by the wave shape). As the current increases the wire melts faster, and eventually the short clears when the drop at the end of the wire separates from the wire. The voltage across the arc is higher than the short voltage, so the current decreases (again at the normal machine inductance rate) for a CV output. The clearing of the short can be a violent action and create undesired spatter.

The prior art has attempted to reduce spatter by reducing the current during, or just before, the transition from short to arc. Early attempts included changing the resistance using a switch in the current path. (See. e.g., U.S. Pat. No. 5,001, 326). These attempts were largely unsuccessful because they still were not fast enough to reduce the current before the arc formed. A significant improvement was predicting when the arc would form, based on the rate of change of output power (dp/dt). This prediction provided enough advance time to overcome the lag time in the current command, thus the current was reduced before the arc formed. This greatly reduced spatter. The predictive technique is described in U.S. Pat. No. 6,087,626 (hereby incorporated by reference). While the predictive control works well, it is a sophisticated control scheme, and not necessarily consistent with low cost welders.

Another improvement was using mechanical control of the wire to create the arc. The arc is formed when the wire is retracted (or the advance is slowed). Thus, the transition to the arc occurs at a known time and the current is lowered prior to that time. Alternatively, the current is lowered, and then the wire is retracted. Because the current is low when the arc is formed, spatter is reduced. This sort of system is described in U.S. Pat. No. 6,984,806 (hereby incorporated by reference). While this system performs well it requires a wire feed motor close to the arc, which can also add cost and complexity to the welding-type system.

Accordingly, a welding-type system that provides an output for short arc welding with reduced spatter is desired.

SUMMARY OF THE PRESENT INVENTION

According to a first aspect of the disclosure a short arc welding-type system includes a power circuit and a controller. The power circuit has a control input and a power output and the controller has a control output connected to the control input, along with a current feedback input responsive to an output current and a voltage feedback input responsive to an output voltage. The controller also has a peak short current detection module that responds to the current feedback input and an arc/short state detection module that responds to the voltage feedback input. The controller further includes a short time detection module that responds to the arc/short state detection module and a dive module that responds to the peak detection module and the arc/short state detection module. The controller further has a post dive module that is active after the dive module and responds to the short time detection module. The controller further includes a normal rate module that responds to the current feedback input and the voltage feedback input.

Controller, as used herein, includes digital and analog circuitry, discrete or integrated circuitry, microprocessors, DSPs, etc., and software, hardware and firmware, located on one or more boards, used to control a device such as a power supply or power source. Peak short current detection module, as used herein, is a module that detects at least one of the peak short current of a given weld cycle or the command peak short current of the given cycle. Arc/short state detection module, as used herein, is a module that detects whether the output is in a short state or an arc state. Short time detection module, as used herein, is a module that determines the duration of the short state of the given cycle. Dive module, as used herein, is a module that, in response to the process transitioning from the short state to the arc state, causes the output current to be reduced at a dive rate until the output current magnitude falls to an ending threshold set as a function of or percentage of the actual or commanded peak short current, and then ending the dive rate. Post dive module, as used herein, is a module activated after a dive module, and it causes the output current to decrease at a rate less than the dive rate, and/or remain at a steady rate for an active time that is a function of and/or a percentage of the time the output is in the short state for the given cycle. Normal rate module, as used herein, is a module that causes the output current to change at a normal rate. Dive rate, as used herein, is a rate of current decrease that exceeds the normal current rate of change on the output of a welding-type system. Normal current change rate, or normal rate, as used herein, is the rate of change used by a welding-type system under typical conditions, and can be based on the power supply inductance, or an apparent inductance. Apparent inductance, as used herein, is the inductance that would provide a rate of change of a welding-type output when that rate of change is provided by commanding the output under typical conditions (which exclude conditions such as during a dive or post dive portion of a waveform). A steady rate of output current, as used herein, is a rate that is not commanded to change significantly, and includes changes due to output perturbations about a setpoint. Module, as used herein, includes software and/or hardware that cooperate to perform one or more tasks, and can include digital commands, control circuitry, power circuitry, networking hardware, etc.

According to a second aspect of the disclosure a method of providing welding-type power for short arc welding includes monitoring the actual or commanded peak short current in the short state for a given cycle to determine a peak short current, and monitoring whether the output is in a short state or an arc state for the given cycle. The time the output is in the short state is tracked for the given cycle. During the short state the current is allowed to increase. In response to the process transitioning from the short state to the arc state the current is lowered at a dive rate that is at least twice a normal current change rate. After the dive rate ends the current is reduced at a rate of change less that the dive rate. The process returns to the short state, and this is repeated for a plurality of cycles.

Ending the dive rate occurs after at least one of the current magnitude falls to a threshold, a determined time passes, or a number of amp-seconds has been provided, in various embodiments The threshold is a function of the determined peak short current, and/or a percentage of the determined peak short current of the given cycle, in other embodiments.

After the dive rate ends, and before reducing the current at a rate of change less than the dive rate, the current is allowed to remain at a steady rate for a period of time equal to a second percentage of the time the output is in the short state for the given cycle in another embodiment.

Reducing the current at a rate of change less than the dive rate includes providing current for the rest of the arc state to melt the wire to the desired amount in another embodiment.

The first percentage (at which the dive rate ends) is between 70% and 80%, and/or at most 75% of the peak current, in various embodiments.

The second percentage (which is the time at which the post dive state ends) is between 20% and 30% and at least 25% in various alternatives.

The current increases in the short state increase at the normal current rate of change in one embodiment.

The dive rate is at least three and/or at least four and/or at least eight times the normal current change rate in other embodiments.

The plurality of cycles are successive cycles in another embodiment.

The normal rate module is active when the dive module and the post dive module are inactive in another alternative.

The controller includes a short arc sequencing module in one embodiment. Short arc sequencing module, as used herein, is a module that activates the following modules, in the following order: a normal rate module, a dive module, a post dive module, and the normal rate module, wherein the activation is repeated for a plurality of cycles.

Other principal features and advantages of will become apparent to those skilled in the art upon review of the following drawings, the detailed description and the appended claims.

Before explaining at least one embodiment in detail it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting. Like reference numerals are used to indicate like components.

DETAILED DESCRIPTION OF THE PREFERRED EMBODIMENTS

While the present disclosure will be illustrated with reference to a particular welding-type system with a particular power circuit and control scheme, used for particular welding processes, it should be understood at the outset that the invention can also be implemented with other welding-type systems, other power circuits and other control schemes, and used for other welding processes. The description includes a description of reduced wire feed speeds, and followed by a description of a control short arc welding system. These aspects can be combined on a single system or can each be implemented without the other.

Generally, a welding-type system that provides a waveform for short arc welding and/or that provides a reduced wire feed speed to avoid excessive input current (and to avoid tripping a circuit breaker) is disclosed. Welding-type system, as used herein, includes any device capable of supplying welding-type power, including ancillary devices such as a wire feeder, robot, etc. Welding-type power, as used herein, refers to welding, plasma, induction heating power, or hot wire welding/preheating (including laser welding). Controller, as used herein, includes digital and analog circuitry, discrete or integrated circuitry, microprocessors, DSPs, etc., and software, hardware and firmware, located on one or more boards, used to control a device such as a power supply or power source.

Figure 1:
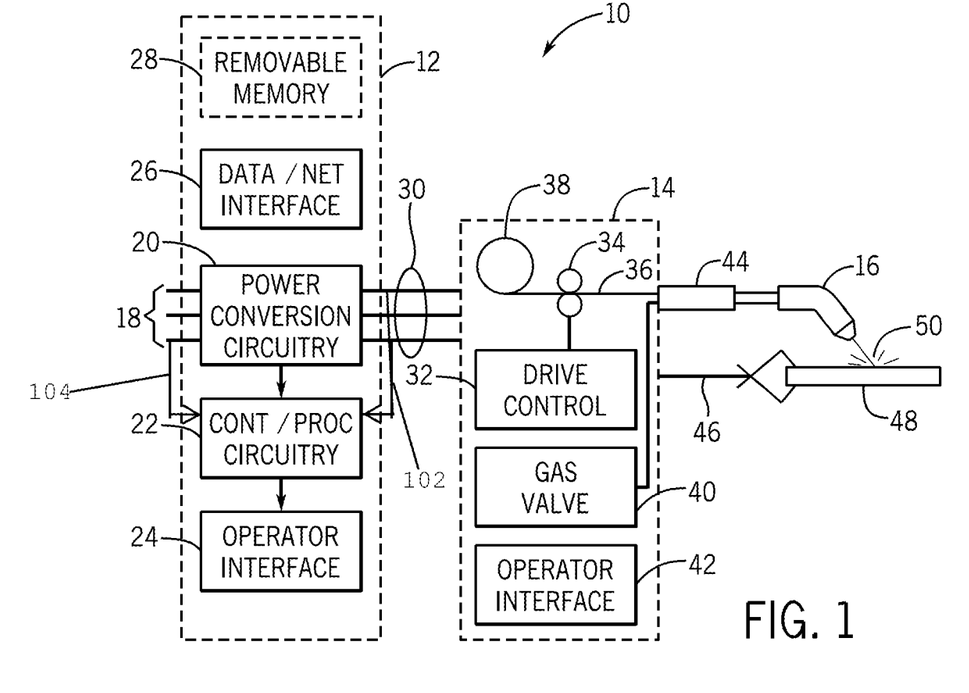
FIG. 1 is block diagram of a welding-type system.

Turning now to FIG. 1, a welding-type system 10 is a GMAW system, and in particular a MIG welding system. Other embodiment provide for system 10 being flux core or other wire fed process. In this example system a power supply 12 receives and converts power that is applied to a wire feeder 14. The wire feeder delivers the power to a welding torch 16 for completing a welding operation. Although the present disclosure used this GMAW power supply as an example for presentation of the new circuitry and control techniques, it should be understood that the same teachings may be applied to power supplies used for other welding processes, as well as for other metal-working processes, such as plasma cutting. Other than the details described herein, welding-type system 10 operates as set forth in patent application 2014-0376268.

The power supply 12 receives input power 18 from any suitable source, such as the power grid, an engine generator set, hybrid power supplies, fuel cells, batteries, or a combination of these. Power conversion circuitry 20 converts the power to a form suitable for a welding (or other metal-working) process. The power supply may be designed to carry out multiple different welding processes that can be selected by an operator, and the power conversion circuitry includes components, such as solid state switches that allow for power conversion in accordance with the desired process. Power source 12 is preferably a voltage-controlled power source. Voltage-controlled power source (also called a CV power source), as used herein, is a power source wherein the output voltage is monitored, and the output is adjusted to provide the desired voltage. The voltage may be constant during the welding process, or may have a desired waveform of varying voltage. Other embodiments provide for using a current-controlled power source.

Control and processing circuitry 22 is coupled to the power conversion circuitry 20 and controls the operation of the power conversion circuitry during the selected process. For example, the control and processing circuitry 22 may provide signals that regulate the conductive states of solid state switches within the power conversion circuitry to produce the desired output power, as also discussed below. In many applications the control and processing circuitry will include one or more digital processors or microprocessors with associated memory to store and carry out the processes available on the power supply. Such processes may include constant voltage (CV) processes, constant current (CC) processes, pulsed processes, cutting processes, and so forth. The processes and other welding parameters may be selected via an operator interface 24 that is coupled to the control and processing circuitry 22. The power supply may further include circuitry that allows for communications with remote or networked components and systems, illustrated as data/network interface 26 in FIG. 1. Such circuitry may allow for monitoring of welding operations, logging of weld data, downloading or configuration of new processes and updates to processes, and so forth. Finally, the power supply will sometimes include removable memory 28 that may be used for storing processes, process parameters, system updates, and any suitable data.

Power and data may be transferred from the power supply 12 to the wire feeder 14 via one or more cables or cable bundles 30. The wire feeder itself comprises a drive control circuitry 32 that regulates the operation of a drive assembly 34. Drive control 32 along with control circuitry 22 together are the controller for system 10. The controller may include other control modules as well. The drive assembly 34 contacts and feeds a wire electrode 36 to the welding operation. The wire electrode is typically stored on a spool 38 within the wire feeder. The wire feeder may also include one or more gas valves for providing shielding gas for a welding operation. Finally, an operator interface 42 may allow certain parameters of the wire feeder to be selected, such as wire feed speed. The power supply and wire feeder may operate in coordination so that wire and gas resources are fed to the welding operation when power is provided for welding at the initiative of the welding operator (e.g., via a control on the torch). In some embodiments the power supply and wire feeder may be integrated into a single package. The wire and gas resources are provided via a weld cable 44 coupled to the torch. A second or work cable 46 is typically clamped or coupled in some manner to a workpiece 48 for completing the electrical circuit. The full circuit is completed during the welding operation by an arc as indicated at reference numeral 50.

Power circuit 20 preferably includes an input rectifier that converts AC power to DC power, a power factor correction boost circuit that receives the rectified input and provides a boosted bus to an isolated converter, preferably a dual two-switch interleaved forward converter that itself includes an output rectifier and an output inductor. Wire feeder 14 feeds the wire at a rate set by the user, and controller 22 causes power circuit 18 to provide an output at the current necessary for that wire feed speed, and at the desired voltage.

Figure 2:
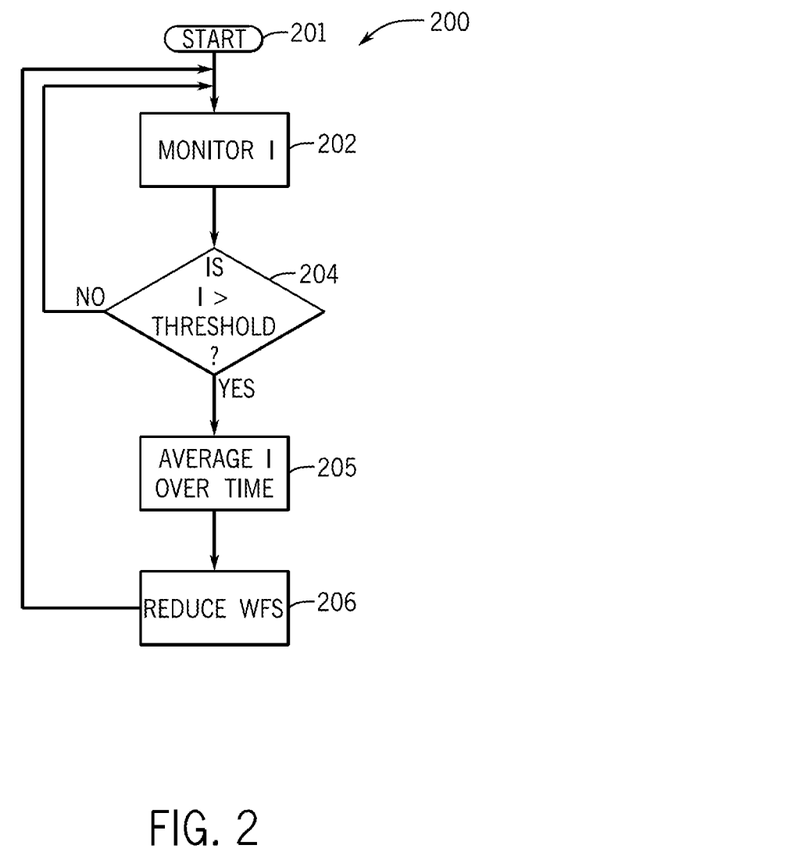
FIG. 2 is a flow chart of a control scheme to limit the wire feed speed and input current of a welding-type system.

Controller 22 includes in some embodiments an input limiting module 200, represented by the flowchart of FIG. 2. Input limiting module 200 implements a scheme that starts at step 201. The current feedback signal from line 102 (or elsewhere) is monitored at step 202. Input limiting module, as used herein, is a module that acts to limit the input to a welding-type system below that which would otherwise be drawn, by controlling a power circuit. The monitored current is compared to a threshold by a comparator 204. The inputs to comparator 204 are the current feedback, and the threshold. If the feedback current is greater than (or equal to) the threshold, then the excess current (the amount over the threshold) is accumulated or averaged by averaging module 205. Averaging module, as used herein, includes a module that receives an input and provides an output responsive to the average of the input over time. The wire feed speed command is reduced based on the average excess current, so that the likelihood of a breaker trip is low, and to avoid causing the arc to suffer.

Figure 3:
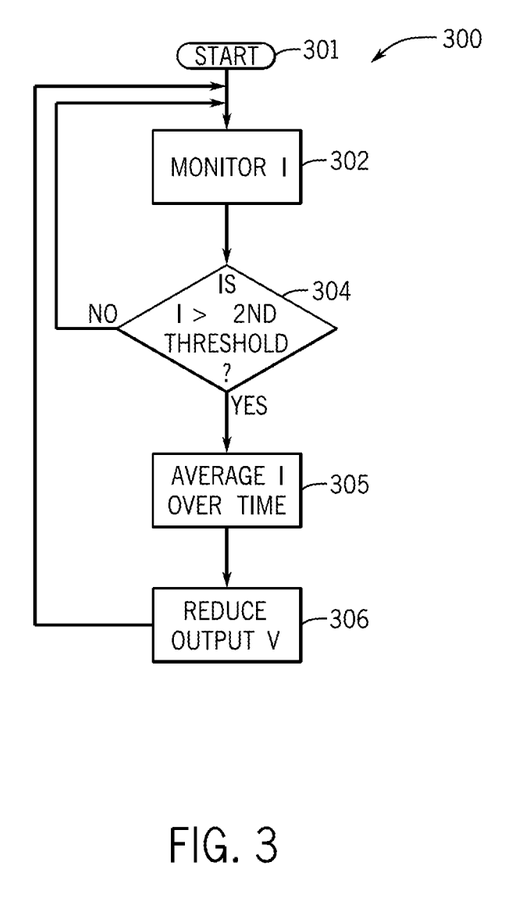
FIG. 3 is a flow chart of a control scheme to limit the output voltage of a welding-type system.

A safety or fallback voltage control loop is provided in one embodiment that works particularly well for resistive loads. FIG. 3 shows an output voltage limiting module 300 that operates in a manner similar to input limiting module 200, except the reduced parameter is output voltage. Output voltage limiting module, as used herein, is a module that acts to limit the output voltage of a welding-type system below the voltage otherwise commanded, by controlling a power circuit. Output limiting module 300 implements a scheme that starts at step 301. The current feedback signal from line 102 (or elsewhere) is monitored at step 302. Then, the monitored current is compared to a second threshold by a comparator 304. The second threshold preferably correlates to 10% greater than the threshold for comparator 204, but it could be other values. If the feedback current is greater than (or equal to) the second threshold, then the excess current (the amount over the second threshold) is accumulated or averaged by averaging module 305. The output voltage command is reduced based on the average excess current. Reducing the output voltage helps further reduce the likelihood of a breaker tripping, particularly when the system is being tested or serviced on a resistive load. Alternatives include using code, hardware or both to implement these modules. One alternative includes having input limiting module 200 include the function of module 300. Another alternative provides for using only module 200, or only module 300. The latter is particularly suited for non wire feed processes. Another alternative provides for making the comparison after the averaging.

Figure 4:
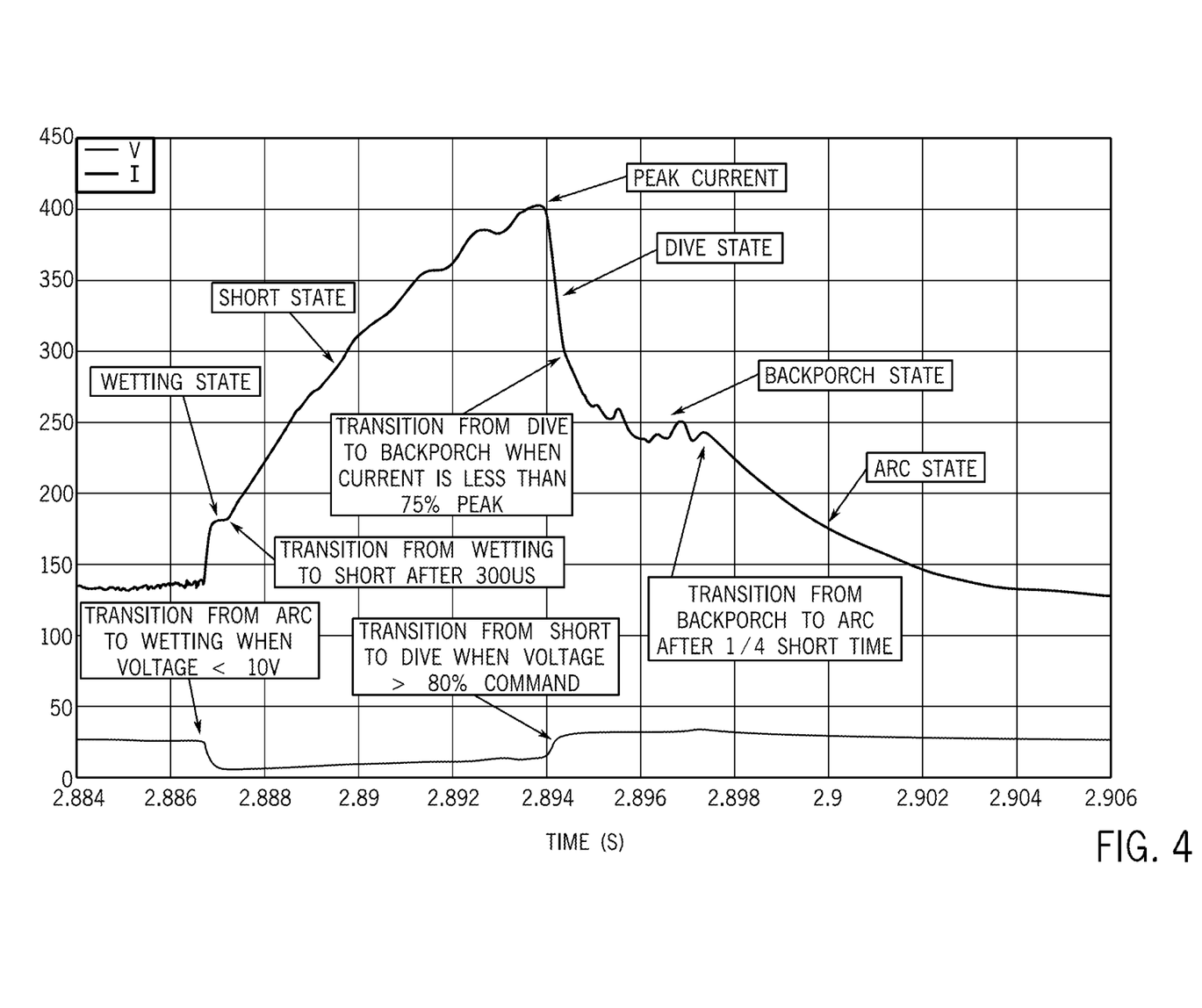
FIG. 4 is a wave form for a short arc cycle.

Another aspect is the welding-type system being a short arc welder. Controller 22 includes control modules to control the output for short arc welding, preferably a CV output. Preferably the short arc control provides that the output current follows a desired waveform. One possible wave form is shown in FIG. 4. Generally, the short arc cycle is described as short, followed by arc (and then repeating). Because the process is cyclical, it could be described as starting anywhere in the cycle, and then repeating when the process returns to that point. When there is a CV output, the process naturally alternates between arc and short, as described above. Using the waveform of FIG. 4 and/or the control scheme described below, results in a CV short circuit output with less spatter.

The cycle start in FIG. 4 at the wetting state where the short is formed. The output current is increased until the short clears. In the preferred embodiment the increase is at the normal rate, although other rates could be used. During the time the output is in the short state a determined park short current for each cycle is found using current feedback or using the commanded peak current. Determined peak current refers to the actual or commanded peak current. Also, the time that the process is in the short state is recorded. Short clearing is detected by a change in output voltage. When the voltage suddenly increases, it means the short has cleared.

When the short clears the current is decreased at a dive rate. The dive rate is preferably 2, 3, 4 or 8 times the normal rate, but can be more than 8. The dive rate continues until the current magnitude falls to a threshold, and/or a determined time passes, and/or a number of amp-seconds has been provided. The threshold is preferably a function of the actual or commanded peak short current, such as a percentage of the peak short current of the short that just ended (which is in that cycle given when the cycle started), in the preferred embodiment. More preferably the percentage is about 75%, or 70-80%, or at least 75%. Thus, when the current decreases to or below the threshold (for example to below 75% of the peak short current), the dive rate ends.

When the dive rate ends the current is reduced at a rate of change less than the dive rate. One alternative provides for allowing the current is to remain at a steady rate before the current is reduced at the rate of change less than the dive rate. For example, the steady rate can be provided for a period of time equal to a second percentage of the time the output is in the short state for the given cycle. Other alternatives provide for a slight decrease (which is a lesser rate than the normal rate). This is called the post dive state and is maintained for a time that is preferably a percentage of the time the current was in the short state in that cycle. More preferably the post dive state (also called the porch) is maintained for about 25% of the time spent in the just ended short state (in that cycle, given when the cycle started). Alternatives include spending 20-30% of the short time in the post dive state, or spending at least 25% of the short time in the post dive state. Another alternative provides that post dive rate is such that the current for the rest of the arc state is sufficient to melt the wire to the desired amount.

After the post dive state ends the current decreases at the normal rate until a short forms, and then the cycle repeats.

Figure 5:
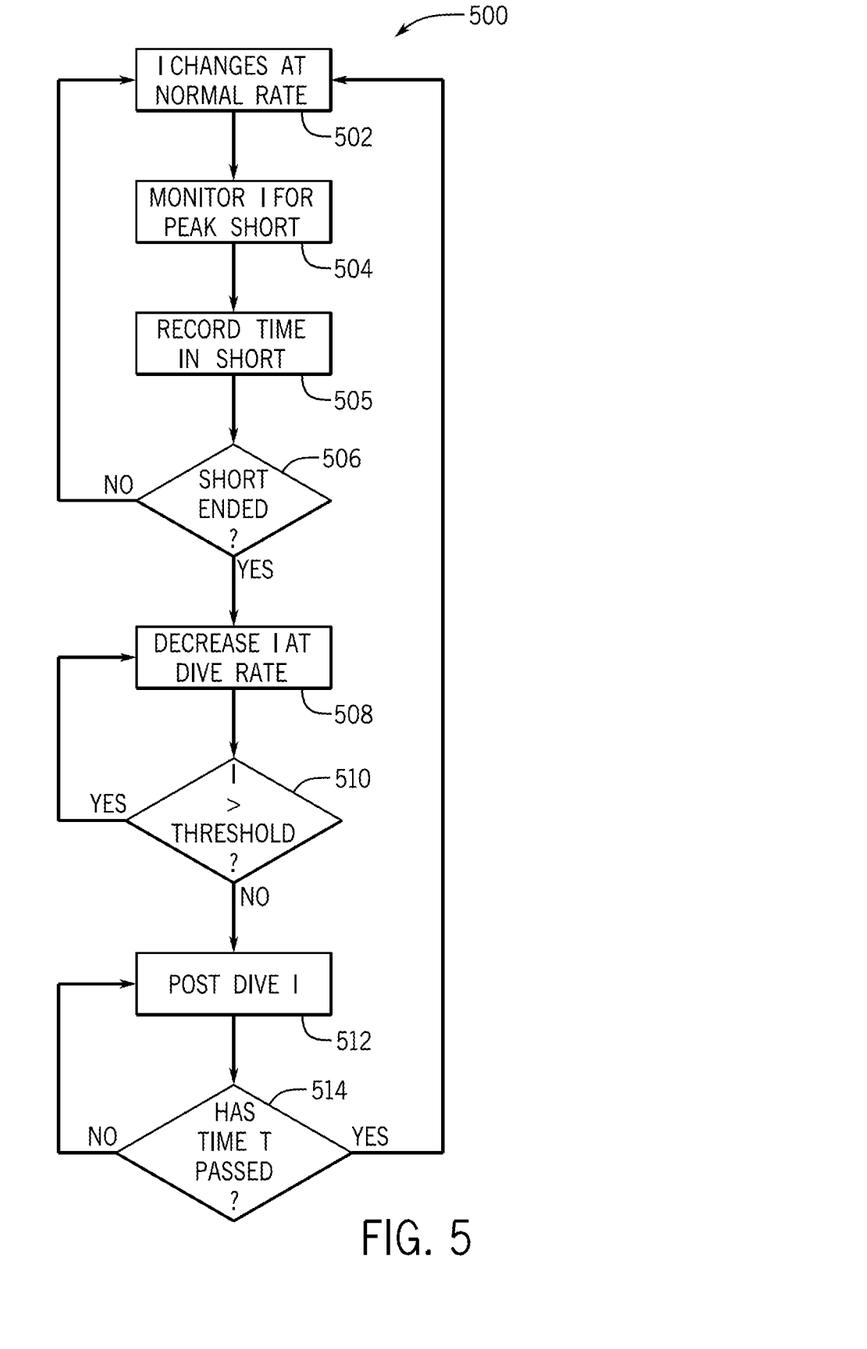
FIG. 5 is a flow chart of a control scheme for a short arc process.

Controller 22 preferably includes a short arc module to implement a control scheme that provides the waveform of FIG. 4. FIG. 5 shows such a short arc module 500, and is implemented in software, but could be implemented by hardware or a combination thereof. Short arc module 500 resides in software in controller 22 in the preferred embodiment, but may be part of drive control 32, or located elsewhere. The preferred embodiment provides that short arc module 500 receives feedback responsive to the system voltage and current on feedback line 102 (FIG. 1), which represents multiple feedback lines. Alternatives include receiving feedback responsive to current elsewhere in system 100, such as within power circuit 18, or from electrode 36. Preferably, wherever the current and voltage feedback is obtained, it can be correlated to the system output current and voltage.

Short arc module 500 begins at step 502 with the process in the arc state and with the current increasing at the normal rate for a CV output in the short state. Step 502 is a normal rate module because the current changes increases at the normal rate (for the output voltage and inductance). Alternatives provide for a rate of increase other than the normal rate.

The output current and/or commanded current is monitored by a peak short current detection module 504. Module 504 receives a signal indicative of the output current and/or commanded current, and in response thereto output module 504 stores the determined peak current during the short.

The time spent in the short is recorded by short time detection module 505, Module 505 responds to the output voltage. In one embodiment short time detection module is reset when the short state begins, and continues to count time until arc/short state detection module 506 determines the short has ended. Arc/short state detection module 506 is responsive to the voltage feedback.

If arc/short state detection module 506 determines that the short has not ended, the control continues to increase the current at the rate set by module 502. When module 506 determines the short has ended, a dive module 508 causes the current to rapidly decrease, at a dive rate. Dive module 508 remains active until the current drops below the threshold set at step 510, preferably a function of the determined peak short current, such as 75% of the peak current (or 70-80%, or at least 75%). Step 510 can be considered part of a dive module, along with step 508. They are activated when the short ends/arc begins, and remain active until the current drops below the threshold. Preferably the dive rate is about four times the normal rate, but it can be other values greater than the normal rate.

When dive module 510 becomes inactive because the current drops below the threshold, then a post dive module 512 becomes active. Module 512 causes the current to be commanded to a steady value. Alternatively, it can be commanded to change slightly, such as less than the normal rate of change (or even to rise slightly) and/or be held steady. Module 512 remains active until the time set by decision point 514 is reached. Decision 514 can be part of post dive module 512. The time in decision 514 is preferably 25% of the short time determined in step 505 (or 20-30%, or at least 25%). Thus, the post dive module is responsive to the short time and the current feedback, and the ending of the dive state. Alternatives including staying in the post dive state until sufficient wire has been melted.

When post dive module 512 becomes inactive, the current decreases at the normal rate. Because the output is a CV output, the current decreases at a normal rate, until the state changes to short. Then the current increases again, and the process repeats.

Numerous modifications may be made to the present disclosure which still fall within the intended scope hereof.

Thus, it should be apparent that there has been provided a method and apparatus for providing short arc welding power that fully satisfies the objectives and advantages set forth above. Although the disclosure has been described specific embodiments thereof, it is evident that many alternatives, modifications and variations will be apparent to those skilled in the art. Accordingly, the invention is intended to embrace all such alternatives, modifications and variations that fall within the spirit and broad scope of the appended claims.

The invention claimed is:

1. A method of short arc welding, wherein the weld is a cyclical output, with each cycle including a short state followed by an arc state, wherein each short state includes a peak commanded short current and an actual peak short current comprising:
   during the short state, controlling an output of a welding-type system to increase a current of the output;
   in response to the process transitioning from the short state to the arc state, controlling the output of the welding-type system to lower the current at a dive rate, the dive rate being a rate of current decrease that exceeds the normal current rate of change on the output of a welding-type system;
   controlling the output of the welding-type system to end the dive rate;
   after ending the dive rate, controlling the output of the welding-type system to lower the current in a post dive state at a rate of change less than the dive rate, wherein a duration of the post dive state is responsive to a duration of the short state;
   controlling the output of the welding-type system in an arc state; and
   controlling the output of the welding-type system to return to the short state.

2. The method of claim 1, wherein ending the dive rate is commanded after the occurrence of at least one of:
   the current magnitude falls to a threshold;
   a determined time passes; and
   a number of amp-seconds has been provided.

3. The method of claim 2, wherein the threshold is a function of the determined peak short current.

4. The method of claim 2, wherein the threshold is a percentage of the determined peak short current of the given cycle.

5. The method of claim 4, wherein the percentage is between 70% and 80%.

6. The method of claim 4, wherein the percentage is at most 75%.

7. The method of claim 2, wherein after the dive rate ends and before reducing the current at a rate of change less than the dive rate, the current is controlled to remain at a steady rate during the post dive state for a period of time equal to a second percentage of the time the output is in the short state for the given cycle.

8. The method of claim 7, wherein the second percentage is at least one of between 20% and 30% and at least 25%, and is responsive to the time the output is in the short state for the given cycle.

9. The method of claim 2, wherein reducing the current at a rate of change less than the dive rate includes providing current for the rest of the arc state to melt the wire to the desired amount.

10. The method of claim 2, wherein the dive rate is set in response to workpiece material and gas type.

11. The method of claim 1, wherein allowing the current to increase in the short state includes allowing the current to increase at the normal current rate of change in the short state.

12. The method of claim 1, wherein the dive rate is at least 4 times the normal current change rate.

13. The method of claim 1, wherein the dive rate is at least 8 times the normal current change rate.

14. A system to provide current for short arc welding having a cyclical output, with each cycle including a short state followed by an arc state, wherein each short state includes a peak commanded short current and an actual peak short current, comprising:
   a power circuit, having a control input and a power output;
   a controller, having a control output connected to the control input, and having a current feedback input responsive to an output current and a voltage feedback input responsive to an output voltage, the controller configured to:
      monitor whether the output is in a short state or an arc state for the given cycle;
      control the power output of the power circuit to increase a current of the output during the short state;
      in response to the process transitioning from the short state to the arc state, control the power output of the power circuit to lower the current at a dive rate, the dive rate being a rate of current decrease that exceeds the normal current rate of change on the output of a welding-type system; and
      control the power output of the power circuit in a post dive state to lower the current at less than the dive rate, wherein a duration of the post dive state is responsive to a duration of the short state;
      control the power output of the power circuit in an arc state; and
      control the power output of the power circuit to return to the short state.

15. The system of claim 14, wherein the controller is configured to control the power circuit to end the dive rate after the occurrence of at least one of: the current magnitude falls to a threshold; a determined time passes; and a number of amp-seconds has been provided.

16. The system of claim 15, wherein the controller is configured to:
   monitor at least one of the commanded peak short current and the actual peak short current; and
   control the power circuit to end the dive rate responsive to monitoring at least one of the commanded peak short current and the actual peak short current.

* * * * *